Dec. 9, 1952     J. H. BERRY     2,620,724
BALER

Filed Jan. 26, 1951     3 Sheets-Sheet 1

INVENTOR.
J. H. Berry

Dec. 9, 1952 J. H. BERRY 2,620,724
BALER
Filed Jan. 26, 1951 3 Sheets-Sheet 2
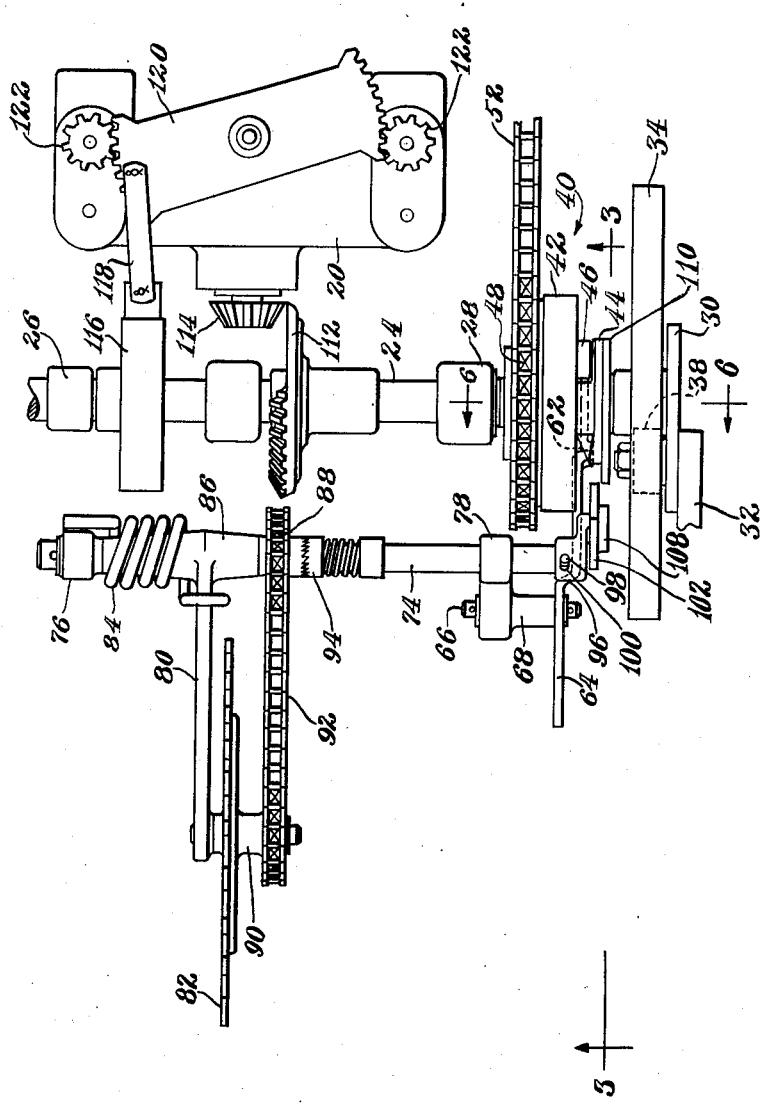
INVENTOR.
J. H. Berry
BY
Attorneys Dec. 9, 1952   J. H. BERRY   2,620,724
BALER
Filed Jan. 26, 1951   3 Sheets-Sheet 3

INVENTOR.
J. H. Berry
BY
Attorneys

Patented Dec. 9, 1952

2,620,724

UNITED STATES PATENT OFFICE 2,620,724
BALER

Jack H. Berry, Rock Island, Ill., assignor to Deere & Company, Moline, Ill., a corporation of Illinois Application January 26, 1951, Serial No. 207,961

1 Claim. (Cl. 100—4)

This invention relates to a baler for baling hay or straw or like material. More particularly, the invention relates to improved clutch control means for initiating and discontinuing operation of the tying mechanism for tying successive bales.

In a typical baler, hay, straw or like material is fed in successive charges or increments to an elongated rectangular bale case and these charges are compressed into bales of suitable length by bale-forming means such as a reciprocating plunger. A measuring wheel or similar device operative incident to the attainment by a bale of a predetermined length is effective to initiate operation of mechanism which ties a bale with wire or twine. Preferably, the tying operation occurs between strokes of the plunger and is therefore of short duration. Of not infrequent occurrence in balers of this type is the failure of the control mechanism to operate properly, which may result in causing the tying mechanism to miss or to tie two or more times in immediate succession. Operational failures of this character have been traced to faulty operation of the mechanism that controls the clutch for initiating and discontinuing operation of the tier.

In most balers of the general character referred to, the clutch utilized to drive the tying mechanism is of the one-revolution type comprising a constantly rotating part and an intermittently rotating part, together with a connecting member carried by the intermittently rotating part and normally disengaged from the constantly rotating part. The two parts are connected together for a single revolution by means causing the connecting member to establish engagement with the constantly rotating part. This means normally takes the form of a trip member which, during relative rotation of the clutch parts, engages the connecting member and which is shiftable out of the path of the connecting member to permit the connecting member to make the connection between the clutch parts. The trip is spring-loaded or otherwise biased to its position in which it engages the connecting member. The operation is such that the trip member is quickly shifted and then returned to its initial position so that upon the completion of one revolution by the clutch parts together, it will be in position to engage the connecting member to again discontinue rotation of the intermittently rotating part. It will thus be seen that failure of the trip member to return to its initial position will result in rotation of the clutch parts beyond a single revolution, According to the present invention, the means for controlling the trip member is improved to the extent that operation of the trip member is made positive to the end that operation of the clutch parts through more than a single revolution in succession cannot occur. Initial action of the trip member is effected by means incident to the formation of a bale, in the usual manner, but the improved design includes means for moving the trip or control member to a disengaged position and for holding it temporarily in that position so that the clutch parts may be engaged for rotation together. The positive means for causing return of the trip member to its initial position preferably comprises a force-transmitting member deriving power from the intermittently rotating part and effective subsequent to engagement of the clutch parts but prior to the completion of one revolution thereby for positively bringing about a condition in which the trip and control members will be restored to their initial positions. It is a further feature of the invention to utilize the improved design for overcoming a temporarily static condition of the trip member that results from the fact that the bale is being tied during strokes of the plunger, in which case the bale is stationary and therefore cannot operate the measuring means upon which operation of the trip member is initially dependent. Further, the force-transmitting member on the intermittently rotating clutch part accelerates operation of the trip member so that the position thereof is quickly restored in time to interrupt operation of the clutch upon completion of a single revolution thereof.

The foregoing and other important objects and desirable features inherent in and encompassed by the invention will become apparent as a preferred embodiment of the invention is fully disclosed in the following detailed description and accompanying sheets of drawings, in which:

Figure 2 is an enlarged plan view of the upper portion of the structure shown in Figure 1;

In the following description, familiarity with the general principles of the construction and operation of balers of the character disclosed will be assumed. Hence, reference to baler structure will be in general terms only. However, for the purpose of amplifying the basic structure, reliance may be had upon the disclosure of the U. S. Patent to Tuft 2,512,754.

That portion of a typical baler illustrated and to be described herein as a background for the present invention comprises an elongated bale case 10 which, as is generally conventional, is rectangular in cross section. The interior of the bale case forms a chamber in which material such as hay or straw is accumulated and formed into successive bales by bale-forming means such as a reciprocating plunger 12. A bale B is shown in dotted lines in the bale case in Figure 1, wherein the plunger 12 is indicated as being on its compression stroke and the other parts of the mechanism are shown in full lines in the positions they occupy just prior to the tying operation. To the left of the bale B is a portion of a bale B¹ which has already been formed and tied and which serves as a header against which the bale B is compressed.

Figure 1:
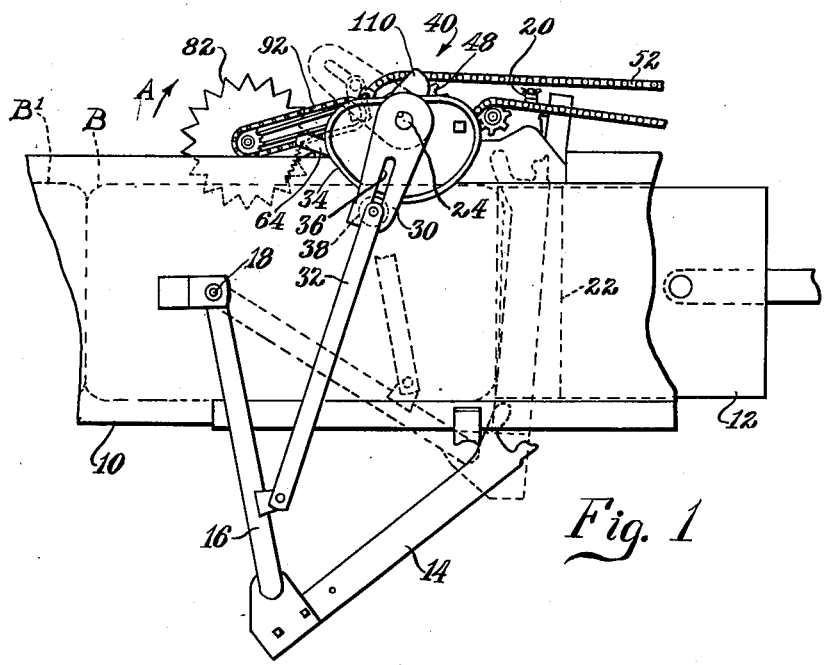
Figure 1 is a fragmentary side elevation of a typical baler to which the improvement has been added.

The tying mechanism for periodically tying bales into individual bundles upon the attainment by each of a predetermined length comprises a needle 14 carried by an arm 16 pivoted at 18 on the side wall of the bale case 10. There are actually a pair of such needles but only one is shown and will be described here for the purposes of clarifying the description. During the accumulation of hay or straw, the needle is in its full-line position as shown in Figure 1, and the plunger 12 reciprocates to accumulate and compress material until the untied bale has reached a predetermined length, after which the needle 14 is caused to move upwardly to the right-hand end of the bale B to carry a strand of wire or twine (not shown) into the lower portion of a tier housing 20 in which is contained suitable mechanism for making a knot or tie in the tying medium, such as is shown in the Tuft patent referred to above. The front portion of the plunger 12 (to the left as viewed in Figure 1) has therein a vertical slot 22 through which the needle 14 travels to and from its dotted-line position. This arrangement is provided so that the tying operation may occur between strokes of the plunger 12.

The foregoing completes the general structural and operational characteristics of a baler of the type referred to in the Tuft patent, and the following description will pertain in detail to the preferred embodiment of the invention as applied to this general structure.

The upper portion of the bale case 10 carries thereacross a rotary drive member which will be hereinafter referred to as a tier shaft 24. This shaft is carried on top of the bale case by suitable bearings such as shown at 26 and 28 in Figure 2. The outer end of this shaft has keyed thereto a needle-operating arm 30 and this arm is connected by a link 32 to the needle-carrying arm or member 16. It will be seen that rotation of the shaft 24 will cause the needle to move upwardly and then downwardly. A cam 34 is fixed to the bale case and the arm 30 has therein a slot 36 so that a roller 38, carried at the connection of the arm 30 with the link 32, may follow the cam to control the positioning of the needle 14. It will be noted that the upper surface of the cam 34 is somewhat flat, which produces a sufficient delay in movement of the needle to its downward position so that the tying mechanism in the tier housing 20 has ample time to function. This structure may also be considered conventional, being disclosed in the Tuft patent referred to above.

The shaft 24 operates only at intervals and is powered by a clutch designated generally by the numeral 40. This clutch comprises a constantly rotating part 42, an intermittently rotating part 44, and a connecting member 46.

Figure 6:
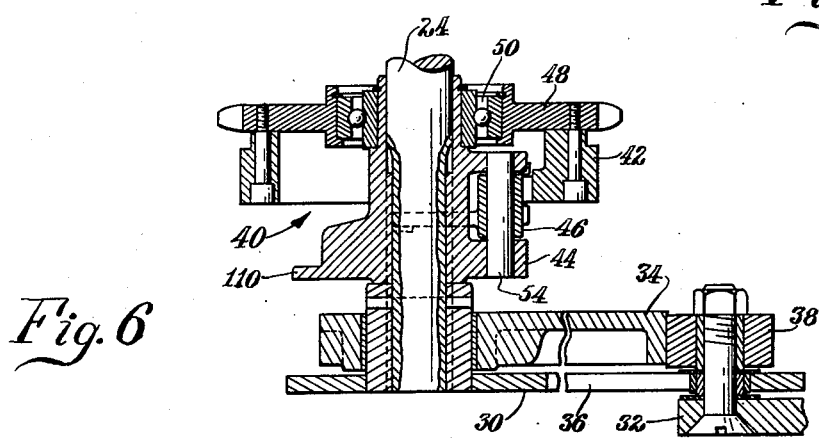
Figure 6 is a transverse fragmentary sectional view taken on the line 6—6 of Figure 2.

The constantly rotating part 42 is journaled on the shaft 24 by means of being affixed to a drive sprocket 48 which is in turn carried by a bearing 50 on a sleeve or hub of the intermittently rotating part 44, which is in turn supported on the shaft 24. A drive chain 52 represents means for supplying power continuously to the sprocket 48. The intermittently rotating clutch part 44 is keyed to the shaft 24 (Figure 6) and the needle-operating arm 30 is likewise keyed to the shaft 24.

The connecting member 46 is pivoted at 54 to and is thus carried by the intermittently rotating part 44. This connecting member has a roller 56 which is selectively engageable with or disengageable from a drive portion in the form of a hump 58 formed on the inner periphery of the annular, constantly rotating part 42. The connecting member 46 is normally biased to a position of engagement with the hump 58 by biasing means here in the form of a small tension spring 60. However, the connecting member 46 may be pivoted about its pivot 54 to a position in which the roller 56 clears the hump 58. Thus, the constantly rotating member 42 can rotate without causing rotation of the intermittently rotating part 44 and the shaft 24 to which it is connected.

The connecting member 46 is preferably in the form of a bell crank, one arm of which carries the roller 56 and the other arm of which, designated by the numeral 62, projects outwardly in a position to be engaged by a control member 64 pivoted on the bale case at 66. The pivotal connection at 66 includes a bracket 68 against which a stop 70 on the control member 64 abuts to limit movement of the control member in one direction under action of biasing means in the form of a light tension spring 72. The structure illustrated and described is preferred but equivalent structure would undoubtedly be useful.

Figure 3:
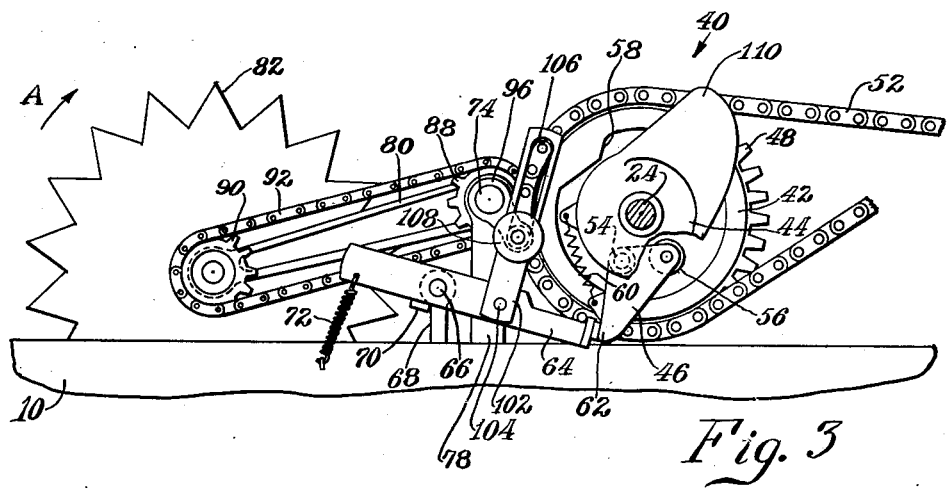
Figure 3 is a longitudinal sectional view, on an enlarged scale, taken substantially along the line 3—3 of Figure 2.

As long as the control member 64 is in the position shown in Figure 3, the free end thereof will engage the arm 62 of the connecting member 46 and will thus swing the connecting member to the position shown so that the roller 56 clears the hump or drive portion 58 in the constantly rotating part 42. Hence, the clutch 40 will be disconnected or interrupted and the sprocket 48 may rotate without causing any action of the tying mechanism or its related parts.

There is supported on top of the bale case 10 a second shaft, which will be hereinafter referred to as a trip shaft 74. This shaft parallels the shaft 24 and may be supported on the bale case by suitable bearings 76 and 78. An incidental function of the shaft 74 in the present disclosure is the supporting of an arm 80 on which is carried a toothed measuring wheel 82. This wheel, as best shown in Figure 1, projects into the chamber within the bale case 10 and engages the material being formed into bales. Each increment or charge of material fed and compressed by the plunger 12 causes the wheel 82 to move angularly in a proportional increment. When the material being accumulated has reached a length sufficient to impart one revolution to the wheel 82, the tying mechanism is actuated, as will be explained below. The wheel 82 is representative of many forms of equivalent devices or means operative incident to the formation of a bale, particularly those operative incident to the attainment by the bale of a predetermined length.

A torsion spring 84 is wrapped around a sleeve portion 86 integral with the wheel-carrying arm 80 and functions to bias the wheel 82 into engagement with the material being baled. The wheel 82 could be otherwise carried, of course.

The trip shaft 74 has journaled thereon a sprocket 88 which is in the plane of a sprocket 90 coaxially secured to the measuring wheel 82. A drive chain 92 connects the sprockets 88 and 90 and, through the medium of a one-way clutch 94, transmits incremental angular movement or rotation of the measuring wheel 82 to the trip shaft 74.

A trip arm or element 96 is connected to the outer end of the trip shaft 74 by lost-motion means here shown as comprising a pin 98 through the shaft 74 and a slot 100 in the hub of the arm 96, the arm being, of course, loose on the shaft 74 to the extent permitted by the slot 100 (Figure 2). For the present, the clutch 94 and lost-motion means 98—100 can be disregarded and it may be temporarily assumed that the sprocket 88 is keyed to the shaft 74 and that the trip arm 96 is likewise keyed to the shaft 74.

The free end of the trip arm 96 is associated with the control member 64 by means effecting a connection between these two members whereby angular movement of the trip arm 96 through a certain range will cause movement of the control member 64 against the tension in the spring 72. Part of the means effecting this connection comprises a link 102 pivotally connected at one end at 104 to the control member 64 and having at its other end portion an elongated slot 106 within which rides a roller 108 carried at the free end of the trip arm 96. The arrangement is such that the trip arm 96 may accomplish a major portion of its one revolution without affecting the control member 64, shifting of the control member occurring only after the roller 108 bottoms in the slot 106 after a predetermined time interval, or at a predetermined point in the angular range of the trip arm 96, thereby disengaging the control member 64 from the arm 62 of the connecting member 46, resulting in initiation of rotation of the clutch 40 through a single revolution. Further details of the operation will be brought out below.

Another important feature of the invention is the force-transmitting means driven by the intermittently rotating clutch part 44 for the purpose of restoring the trip arm 96 and control member 64 to their initial positions. In the preferred form of the invention illustrated, this force-transmitting means takes the form of a cam member 110 preferably formed integrally with the intermittently rotating part 44 and positioned and timed so as to engage the roller 108 on the trip arm subsequent to initiation of rotation of the intermittently rotating part 44 but prior to completion of a single revolution of said part.

Although the particular type of tying mechanism contained in the housing 20 is not important by itself in the present case, reference will be made generally to some of the parts thereof to facilitate a complete understanding of the operation of the mechanism. The intermittently rotating shaft 24 has keyed thereto a mutilated bevel gear 112 which at times meshes with a bevel pinion 114 which serves as an input or driving member for the mechanism within the tier housing 20. This driving means causes operation of part of the tying mechanism. The shaft 24 also has keyed thereto a cam 116 which operates at times through a link 118 to oscillate a segmental gear 120 in mesh at its opposite ends with small pinions 122. Having reference to the Tuft patent mentioned above, the bevel pinion 114 drives twister gears and the pinions 122 drive kinker and cut-off gears (neither of these components being shown here).

Figure 5:
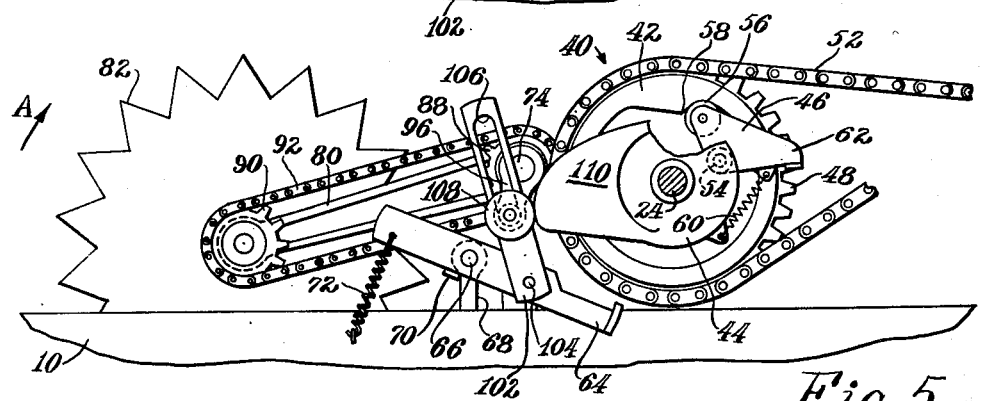

The operation of the mechanism in its over-all aspect is as follows: As previously stated, increments or charges of material are accumulated and compressed in the bale case 10 by means of the reciprocating plunger 12. As each charge of material is compressed, it causes incremental angular movement of the measuring wheel 82 in the direction of the arrow A. The starting position of the parts may be based upon a composite of Figures 3 and 5. That is to say, the trip arm 96 will be slightly to the left of the position shown in Figure 5 (because the arm 96, when struck by the cam 110, will snap to the left of the exact position shown in Figure 5), which will place the control member 64 in the position of Figure 3 and the projecting arm 62 of the connecting member 46 will be engaged by the control member 64 as shown in Figure 3. As the charges of material in the bale case accumulate, the measuring wheel 82 is rotated in increments, which rotation is transmitted to the shaft 74 and trip arm 96.

Figure 4:
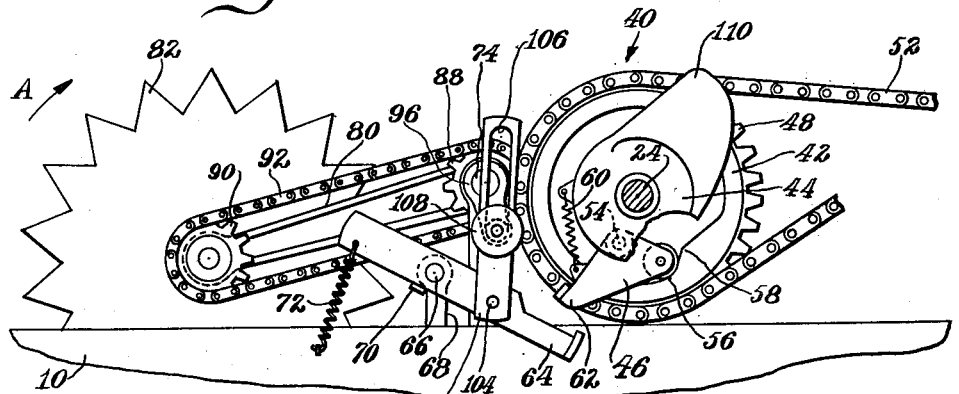
Figures 4 and 5 are sectional views similar to Figure 3 but showing the clutch and control parts in different positions.

When the accumulation of material reaches a predetermined length, the trip arm 96 will have been moved to the position of Figure 3 and the next successive charge of material will be sufficient to cause rotation of the trip arm 96 to the position of Figure 4, wherein it will be seen that the control member 64 is shifted downwardly from its first position (Figure 3) to its second position (Figure 4). In its first position, the control member 64 engages the connecting member 46 so as to effect disconnection between the clutch parts 42 and 44. In its second position, the control member 64 clears the connecting member 46 and permits the connecting member to be drawn by its spring 60 into such position that it will be engaged by the hump 58 of the constantly rotating part 42.

It will be noted from the positions of the parts in Figure 4 that a somewhat positive retention of the control member 64 in its second or disengaged position results. This end flows in part from the relationship between the centers of the shaft 74, the roller 108, and the pivot 104, and in part from the fact that the bale of material is temporarily in a static condition, giving also a static condition of the measuring wheel 82 and trip arm 96. In other words, the parts may be said to be in a releasable condition and cannot be immediately affected by the tension spring 72, since the spring is not strong enough to reverse rotation or angular movement of the interconnected parts. There can be no reverse relative movement at the one-way clutch 94 or at the lost-motion connection 98—100. However, the condition just referred to is eliminated by release of the temporarily held parts by means of the cam 110. This cam is angularly positioned relative to the clutch-connecting member 46 so that immediately subsequent to initiation of revolution of the two clutch parts 42 and 44 together, the cam 110 engages the roller 108 on the trip arm 96, thus causing the trip arm 96 to move to the position of Figure 5, whereupon the spring 72 can return the control member 64 to its first position. Stated otherwise: although the trip arm 96 is temporarily static, the cam 110 on the intermittently rotating part 44 serves as means operative independently of the incremental movement of the trip arm by the measuring wheel 82 for causing the trip arm to move through the remainder of its range. It will be further noted that the incremental movement of the arm 96 as effected by the measuring wheel 82 is somewhat slow, whereas the movement of the arm by the cam 110 through the remainder of its range is considerably faster or accelerated. The result is that the parts are quickly restored to such positions that the control member 64 is again ready to engage the projecting arm 62 on the connecting member 46, which will be apparent from an examination of Figure 5.

Because of the arrangement just described, the clutch 40 can have no more than a single revolution, for the cam 110 effects restoration of the trip parts just after the beginning of the single revolution and prior to the completion of said single revolution.

Reference was made above to the lost-motion connection at 98—100. The purpose of this connection is to allow the trip arm 96 to be moved from the position of Figure 4 to that of Figure 5, it being necessary that relative movement between the trip arm 96 and trip shaft 74 be permitted in this circumstance, since the shaft 74 is held stationary because of engagement of the measuring wheel 82 with the bale B.

The purpose of the one-way clutch 94 is to permit the operator to trip the mechanism by hand in order that the tying mechanism will effect a knot or tie in the wire or twine, either initially when starting the baler without a bale in the chamber or when a partial bale has been formed and there is insufficient twine or wire remaining to tie a full-length bale. Manual tripping is accomplished by manual movement of the control member 64 to its second position, which can be done because of the slot 106. Then when the clutch is energized and the cam 110 strikes the roller 108, the trip arm can be advanced to its starting position (to the left of that shown in Figure 5) even though the measuring wheel 82 is immobile because of its engagement with the bale.

The improvement is simple in design and economical to construct and install. Basically, it is so arranged that it may be provided in balers of existing types without material alteration. Other features and advantages not specifically enumerated will undoubtedly occur to those versed in the art, as likewise will numerous modifications and alterations in the preferred embodiment of the invention illustrated and described, all of which may be achieved without departing from the spirit and scope of the invention as defined in the appended claim.

What is claimed is:

In a baler having a bale case in which material is accumulated and formed into successive bales, which bales are periodically tied by tying mechanism driven by an interruptable clutch of the one-revolution type including a constantly rotating clutch part, an intermittently rotating clutch part, and a connecting member carried by the intermittently rotating clutch part for rotation therewith but shiftable relative thereto from a biased position of connection with the constantly rotating clutch part to a position of disconnection from the constantly rotating clutch part, the improvement residing in mechanism for periodically connecting and disconnecting the clutch parts, comprising: a control member carried by the bale case for movement between a first position of engagement with the connecting member to hold the latter in its disconnected position and hence to idle the intermittently rotating clutch part, and a second position clearing said connecting member for shifting to its position of clutch-parts-connection; a trip arm carried by the bale case for angular movement in increments through a range of 360° and having a lost-motion connection with the control member for engagement in a portion of its range with the control member for effecting movement of said control member to its second position, thereby causing connection of the clutch parts, said lost-motion connection including a slotted link pivoted at one end to the control member, and a pin on the trip arm traveling freely in the slot during a major portion of the range of angular movement of the trip arm and ultimately bottoming in said slot; a force-transmitting member driven by the intermittently rotating clutch part and engageable with the bottomed trip arm subsequent to the beginning and prior to the completion of one revolution of the intermittently rotating clutch part for completing the 360° angular movement of the trip arm independently of the incremental angular movement thereof; and means operative upon said completion of the angular movement of the trip arm for causing return of the control member to its first position to be again ready to engage the clutch connecting member upon completion of said one revolution by the intermittently rotating clutch part.

JACK H. BERRY.

REFERENCES CITED

The following references are of record in the file of this patent:

UNITED STATES PATENTS

| Number | Name | Date |
|---|---|---|
| 1,765,527 | Golnick | June 24, 1930 |
| 2,405,688 | Crumb | Aug. 13, 1946 |
| 2,498,319 | Vutz | Feb. 21, 1950 |
| 2,560,143 | Vietti | July 10, 1951 |